Nov. 17, 1970 D. ZUCKER 3,541,268
ELECTRONIC TELEPHONE CALLING SYSTEM
Filed May 1, 1969
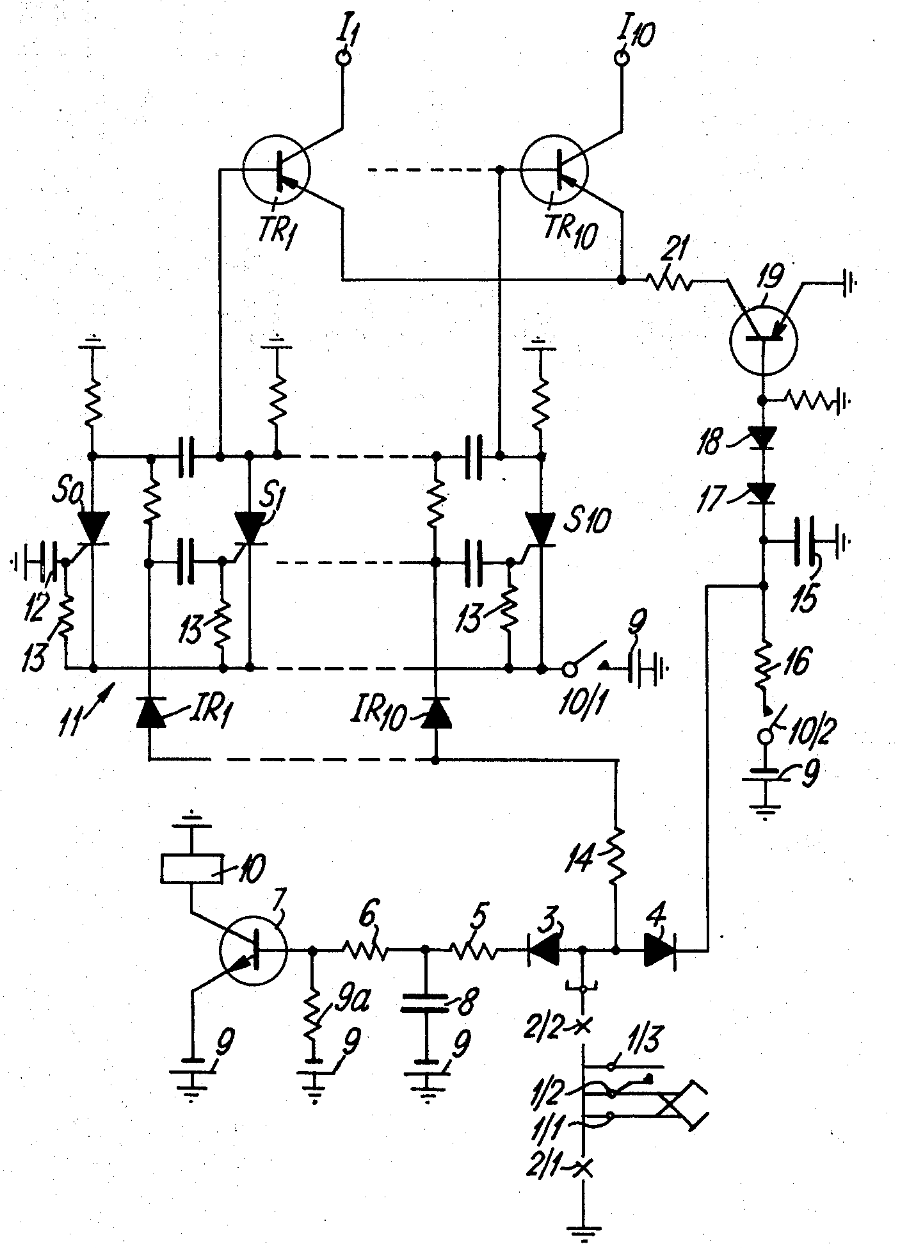
Inventor
DANIEL ZUCKER
By Arthur B. Colvin
Attorney United States Patent Office 3,541,268
Patented Nov. 17, 1970

3,541,268
ELECTRONIC TELEPHONE CALLING SYSTEM

Daniel Zucker, Rishon Lezion, Israel, assignor to Telrad Telecommunication & Electronic Industries Limited, Lod, Israel, a corporation of Israel Filed May 1, 1969, Ser. No. 820,811
Claims priority, application Israel, May 15, 1968, 29,996
Int. Cl. H04m 3/06
U.S. Cl. 179—18 1 Claim

ABSTRACT OF THE DISCLOSURE

This invention relates to an electronic telephone calling system and in particular to an internal telephone system wherein the dialing or calling circuit is altogether separate from the speaking circuit allowing for dialing or calling to take place even when the speaker circuit is busy. The system incorporates a ring counter connected to a plurality of telephone extensions. The individual stages of the ring counter are coupled to respective telephone extensions through a transistor switch.

This invention relates to an electronic telephone calling system. In particular it relates to an internal telephone system to provide communication between a number of internal telephone extensions.

It is an object of the present invention to provide an improved and simplified electronic telephone calling system.

According to the present invention there is provided an electronic telephone calling system comprising a ring counter having a plurality of stages corresponding to a like plurality of telephone extensions, a like plurality of ring counter outputs respectively coupled to the bases of a like plurality of output transistors the collector electrodes of which are respectively adapted to be coupled to said extensions, and the emitter electrodes of which are all connected in circuit with a transistor switch, a potential source, a relay system adapted to place said potential source in circuit via series connected mechanical switch and dial contacts of each extension, the arrangement being such that upon closure of the mechanical switch and rotation of the dial (and consequent closure of the dial contacts) said relay is actuated to place said potential source in circuit, whilst during release of said dial, potential impulses corresponding in number to the number dialed are transmitted to the ring counter thereby successively applying potentials to the bases of said output transistors, only after the complete release of said dial in said transistor switch closed thereby rendering conductive that output transistor corresponding to the number dialed.

One embodiment of an electronic telephone calling system will now be described by way of example and with reference to the accompanying drawing which is a schematic circuit diagram of the calling system.

Each telephone of the system is provided with a set of dial spring contacts (only one set 1/1, 1/2 and 1/3 being shown) and is connected in circuit via a cradle switch 2/1 and a further switch 2/2. The dial contact 1/1 is connected via the cradle switch 2/1 to earth whilst the dial contact 1/3 is connected via the switch 2/2 to the junction of a pair of rectifiers 3 and 4. The rectifier 3 is connected via a pair of resistors 5 and 6 to the base of a junction transistor 7. The junction of the resistors 5 and 6 is connected via a capacitor 8 to a source of negative potential 9 whilst the base of the transistor 7 is connected via a resistor 9*a* to the negative potential source 9. The emitter electrode of the transistor 7 is connected to the negative potential source 9.

A relay 10 is connected between the collector electrode of the transistor 7 and earth.

An eleven stage SCR ring counter 11 of standard construction is provided and includes eleven silicon controlled rectifiers $S_0$–$S_{10}$, the gate electrode of the first SCR $S_0$ being coupled, on the one hand via a capacitor 12 to earth and on the other hand, in common with all the other SCR's via a resistor 13 and through a relay contact 10/1 to the negative potential source 9.

The junction of the rectifiers 3 and 4 is coupled via a resistor 14 to the respective inputs of the SCR counter 11 via respective input rectifiers $IR_1$–$IR_{10}$.

The ten outputs of the SCR counter 11 are respectively fed to the bases of transistors $TR_1$–$TR_{10}$. The collector electrodes of these transistors are respectively coupled to inputs $I_1$–$I_{10}$ of ten telephone instruments (not shown) of the system.

The rectifier 4 is coupled to one plate of a capacitor 15, the other plate of which is connected to earth, said one plate being furthermore connected on the one hand via a resistor 16 and the relay contact 10/2 to the negative potential source 9, and on the other hand, via a pair of series connected rectifiers 17 and 18 to the base of a transistor 19 which is also connected via a resistor 20 to earth. The emitter electrode of the transistor 19 is connected to earth whilst the collector electrode is connected via a resistor 21 to all the emitter electrodes of the transistors $TR_1$–$TR_{10}$.

In operation, the lifting of telephone handset and the depressing of the appropriate internal switch button (not shown) actuates the system by closing the switches 2/1 and 2/2. In consequence, the contact 1/1 is connected to earth whilst the contact 1/3 is connected in circuit. With the rotation of the dial the contacts 1/2 and 1/3 are closed. As a result a charge is built up on the capacitor 8 and the base potential of the transistor 7 reaches a level at which the transistor 7 conducts thereby actuating the relay 10. With the actuation of the relay 10 the relay contacts thereof are closed.

With the closing of the relay contact 10/1 an actuating potential is applied to the SCR ring counter 11 and as a consequence the capacitor 12 is charged and an actuating pulse passes to the gate electrode of the first rectifier $S_0$ as a result of which the latter conducts and places the ring counter 11 in a state wherein it is capable of counting the incoming pulses. After counting the first pulse (the procedure to be described below), an actuating potential is applied to the base of the transistor $TR_1$ associated with the first telephone instrument (zero call number). This transistor $TR_1$ cannot however be rendered conductive so as to actuate the associated telephone instrument unless there is simultaneously applied to the emitter electrode thereof an actuating potential. The emitter electrode of this and of the other transistors of the series $TR_1$–$TR_{10}$ are all coupled via the resistor 29 to the collector electrode of the transistor 19. In consequence the actuating potential can only be applied to any of the emitter electrodes of the transistors $TR_1$ to $TR_{10}$ when the transistor 19 conducts. The conditions and timing of conduction of the transistor 19 will now be discussed.

With the actuation of the relay 10 the contact 10/2 is closed thus putting the negative potential source 9 in circuit with the series connected rectifiers 17 and 18. However, the fact that the spring contacts 1/2 and 1/3 of the dial are closed creates a short circuit via the relay contact 10/2, resistor 16 and rectifier 4 and in consequence the potential on the capacitor 15 can not build up to the level required to reach the breakthrough potential of the series connected rectifiers 17 and 18, and the transistor 19 therefore remains nonconductive.

With the release of the dial the spring contact pair 1/2, 1/3 open and close successively a number of times corresponding to the number dialled and in consequence a corresponding number of impulses is fed to the ring counter 11 which effectively counts the number of impulses. As a result, actuating potentials are successively applied to the bases of the transistors $TR_1$ to $TR_{10}$, the actuating impulse remaining on the base of that transistor which corresponds to the number dialled.

At the same time the relay 10 remains actuated as a result of the discharge of the capacitor 8 which takes place when the contact 1/2, 1/3 are open (the capacitor becoming recharged during the successive closing of the contact pairs 1/2 and 1/3).

Thus during the return movement of the dial the short circuit through the rectifier 4, resistor 16 and relay contacts 10/2 is maintained preventing the build up of a break-through potential on the capacitor 15.

When, however the dialling has been completed (i.e. the dial has fully returned to its starting position) the dial spring contact 1/2 and 1/3 remain open for a sufficiently long time for a break-through potential to build up on the capacitor 15 thereby rendering the transistor 19 conductive. When this occurs, an actuating potential is applied to the emitter electrode of that transistor of the series $TR_1$–$TR_{10}$ to the base of which an actuating impulse has already been supplied from the ring counter 11 and in consequence the telephone instrument associated with that transistor is actuated to give an audible alarm. In this way the required telephone extension is called.

After a predetermined delay period (the discharge period of the capacitor 8) the relay 10 is deactuated resulting in the opening of the relay contact 10/1 and the disconnection of the negative potential from the ring counter circuit 11. As a consequence the applied potential is removed from the particular transistor associated with the called telephone and the system is ready for further dialling.

It is a particular feature of the calling circuit in accordance with the present invention that the dialling or calling circuit is altogether separate from the speaking circuit and this allows for dialling or calling to take place even when the speaking circuit is "busy."

I claim:

1. An eelctronic telephone calling system comprising a ring counter having a plurality of stages corresponding to a like plurality of telephone extensions, a like plurality of ring counter outputs respectively coupled to the bases of a like plurality of output transistors the collector electrodes of which are respectively adapted to be coupled to said extensions, and the emitter electrodes of which are all connected in circuit with a transistor switch, a potential source, a relay system adapted to place said potential source in circuit via series connected mechanical switch and dial contacts of each extension, the arrangement being such that upon closure of the mechanical switch and rotation of the dial (and consequent closure of the dial contacts) said relay is actuated to place said potential source in circuit, whilst during release of said dial potential impulses corresponding in number to the number dialled are transmitted to the ring counter thereby successively applying potentials to the bases of said output transistors, only after the complete release of said dial is said switch closed thereby rendering conductive that output transistor corresponding to the number dialled.

No references cited.

KATHLEEN H. CLAFFY, Primary Examiner

T. J. D'AMICO, Assistant Examier